(12) United States Patent
Koborita et al.

(10) Patent No.: US 10,095,940 B2
(45) Date of Patent: Oct. 9, 2018

(54) IMAGE PROCESSING APPARATUS, IMAGE PROCESSING METHOD AND NON-TRANSITORY COMPUTER READABLE MEDIUM

(71) Applicant: FUJI XEROX CO., LTD., Tokyo (JP)

(72) Inventors: Ryoko Koborita, Yokohama (JP); Toru Fuse, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 375 days.

(21) Appl. No.: 14/745,054

(22) Filed: Jun. 19, 2015

(65) Prior Publication Data
US 2016/0012302 A1    Jan. 14, 2016

Related U.S. Application Data

(63) Continuation of application No. PCT/JP2013/074195, filed on Sep. 9, 2013.

(30) Foreign Application Priority Data

Mar. 21, 2013   (JP) ................... 2013-059087

(51) Int. Cl.
  *G06F 3/048* (2013.01)
  *G06K 9/20* (2006.01)
  (Continued)

(52) U.S. Cl.
  CPC ....... *G06K 9/2081* (2013.01); *G06F 3/04842* (2013.01); *G06K 9/00456* (2013.01);
  (Continued)

(58) Field of Classification Search
  CPC ....... G06F 3/04842; G06T 2207/20104; G06T 2207/20112
  See application file for complete search history.

(56) References Cited

U.S. PATENT DOCUMENTS

5,627,567 A * 5/1997 Davidson .............. G06F 3/0488
                                                          345/170
5,689,667 A   11/1997 Kurtenbach
(Continued)

FOREIGN PATENT DOCUMENTS

CN   102981731 A   3/2013
JP   H11507455 A   6/1999
(Continued)

OTHER PUBLICATIONS

English translation of WO 2009/084084. Fujie, Tetsuya.*
(Continued)

*Primary Examiner* — Omar R Abdul-Ali
(74) *Attorney, Agent, or Firm* — Oliff PLC

(57) ABSTRACT

With regard to objects such as pictures, geometric figures, and symbols shown in the image to be processed by an image processing apparatus, in order to select an object that does not overlap in position with a user-indicated position, an image processing apparatus 100 acquires a user-indicated position in an image 200 in which an object 201 is shown, generates partition regions 209 that partition the target region of the image 200, on the basis of the position of the object 201, identifies a partition region 211 on the basis of a user-indicated position, and determines whether the object 201 has been selected, on the basis of the identified partition region 211.

10 Claims, 11 Drawing Sheets

(51) Int. Cl.
  *G06F 3/0484* (2013.01)
  *G06K 9/00* (2006.01)
  *G06K 9/32* (2006.01)
  *G06K 9/46* (2006.01)
(52) U.S. Cl.
  CPC ......... *G06K 9/3258* (2013.01); *G06K 9/4652* (2013.01); *G06T 2207/20104* (2013.01); *G06T 2207/20112* (2013.01)

(56) References Cited

U.S. PATENT DOCUMENTS

| | | | |
|---|---|---|---|
| 5,926,178 A | 7/1999 | Kurtenbach | |
| 6,618,063 B1 | 9/2003 | Kurtenbach | |
| 7,844,914 B2* | 11/2010 | Andre | G06F 3/041 715/773 |
| 2002/0132665 A1 | 9/2002 | Kato | |
| 2004/0095395 A1 | 5/2004 | Kurtenbach | |
| 2004/0183833 A1* | 9/2004 | Chua | G06F 3/0237 715/773 |
| 2011/0091107 A1* | 4/2011 | Sugihara | H04N 19/60 382/173 |
| 2011/0169748 A1* | 7/2011 | Tse | G06F 3/0425 345/173 |
| 2012/0047098 A1* | 2/2012 | Reem | G06T 11/206 706/12 |
| 2012/0050313 A1* | 3/2012 | Gruber | G06T 11/00 345/606 |
| 2012/0206466 A1* | 8/2012 | Sharp | G06T 1/60 345/543 |
| 2012/0306934 A1 | 12/2012 | Ohashi et al. | |
| 2016/0188181 A1* | 6/2016 | Smith | G06F 3/048 715/765 |

FOREIGN PATENT DOCUMENTS

| | | | | |
|---|---|---|---|---|
| JP | 2003233462 A | | 8/2003 | |
| JP | 2005175641 A | | 6/2005 | |
| JP | WO2009084084 | * | 12/2007 | ............. G06F 3/041 |
| WO | 2009084084 A1 | | 7/2009 | |

OTHER PUBLICATIONS

Mar. 1, 2016 Office Action issued in Japanese Application No. 2013-059087.

Oct. 15, 2013 International Search Report issued in International Application No. PCT/JP2013/074195.

Oct. 27, 2015 Office Action issued in Japanese Application No. 2013-059087.

May 27, 2017 Office Action issued in Chinese Patent Application No. 201380073275.1.

* cited by examiner

IMAGE PROCESSING APPARATUS, IMAGE PROCESSING METHOD AND NON-TRANSITORY COMPUTER READABLE MEDIUM

CROSS REFERENCE TO RELATED APPLICATION

This is a continuation of International Application No. PCT/JP2013/074195 filed on Sep. 9, 2013, and claims priority from Japanese Patent Application No. 2013-059087, filed on Mar. 21, 2013.

BACKGROUND

1. Technical Field

The present invention relates to an image processing apparatus, and an image processing method and a non-transitory computer readable medium.

2. Related Art

Recently, typically for information equipment such as personal computers, cellular phones, and household game machines, graphical user interfaces (to be referred to as GUIs hereinafter) are widely adopted which allow application software to execute various information processing when icons displayed on a display are selected with a pointing device (such as a mouse or a touch panel).

As an operation typically used for selecting an icon displayed on a display by a GUI, for example, a method is known which clicks (taps) on the position of a desired icon to be selected to select the icon. Another known method is to drag a rectangular area so as to overlap a plurality of desired icons to be selected, thereby selecting the plurality of icons.

Such icon selection methods adopted for GUIs may be also applied to image processing apparatuses. Accordingly, for example, with regard to objects such as pictures, geometric figures, and symbols shown in an image to be processed by an image processing apparatus, it is possible to select an object that overlaps in position with a user-indicated position.

SUMMARY

An aspect of the present invention provides an image processing apparatus including: an indicated-position information acquiring unit that acquires indicated-position information, the indicated-position information including at least one user-indicated position in an image in which at least one object is shown; a reference position information acquiring unit that acquires reference position information including a position of the object in the image and vertex coordinates of a target region of the image; a partitioning unit that partitions the target region of the image on a basis of the reference position information to generate a plurality of partition regions; a partition region identifying unit that identifies at least one partition region on a basis of the plurality of partition regions and the indicated-position information; and an object determining unit that determines whether the object has been selected, on a basis of the identified partition region.

BRIEF DESCRIPTION OF THE DRAWINGS

Exemplary embodiment(s) of the present invention will be described in detail based on the following figures, wherein.

DETAILED DESCRIPTION

Hereinafter, embodiments of the present invention will be described specifically and in detail with reference to the figures. In the following figures, components having identical functions will be denoted by identical reference signs, and any repetitive description of these components is omitted herein unless necessary.

[Configuration of Image Processing Apparatus]

Figure 1:
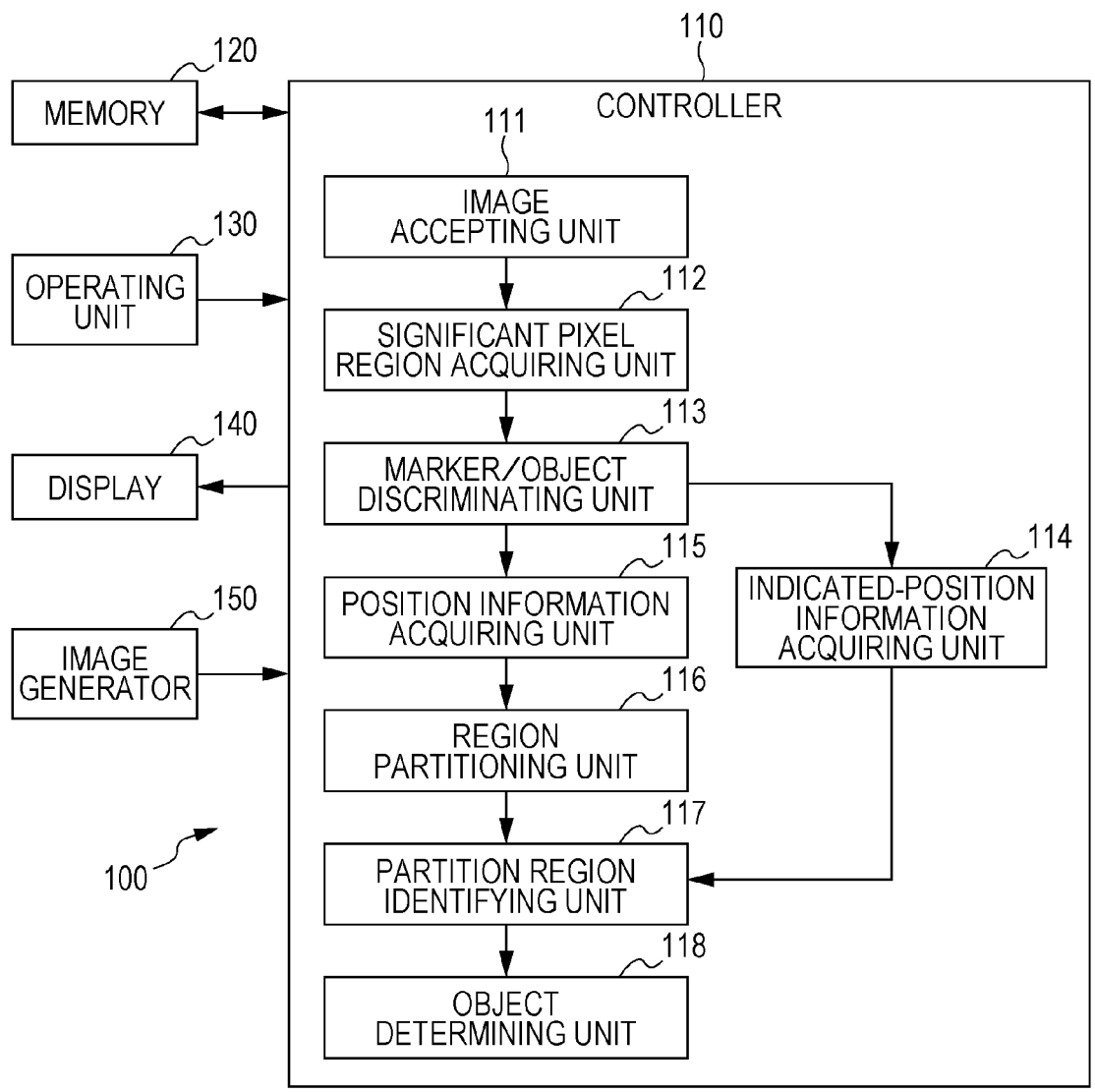
FIG. 1 illustrates an example of an image processing apparatus according to an embodiment of the present invention.

FIG. 1 illustrates an example of an image processing apparatus according to an embodiment of the present invention. As illustrated in FIG. 1, an image processing apparatus 100 includes a controller 110, a memory 120, an operating unit 130, and a display 140.

The controller 110 includes a CPU or the like. The controller 110 operates in accordance with a program stored in the memory 120. The memory 120 includes a RAM, a ROM, and the like. The memory 120 stores a program executed by the controller 110. The memory 120 also functions as a work memory for the controller 110.

The memory 120 may store, in advance, the image data to be processed by the image processing apparatus. The memory 120 may also store, in advance, various data used by the image processing apparatus, such as image data other than the images to be processed.

The memory 120 may be any computer readable information storage medium. For example, the memory 120 may include a hard disk or the like. While the embodiment is directed to a case where the program executed by the controller 110 is stored in the memory 120, this program may, for example, be provided via a communication network such as the Internet. Alternatively, for example, this program may be provided in the form of being stored on various computer readable recording media such as CD-ROMs and DVD-ROMs.

The operating unit 130 is an input device that accepts an operation performed by a user. For example, a keyboard, a mouse, an operating button, or the like is used for the operating unit 130. Information about an operation accepted by the operating unit 130 is output to the controller 110. The display 140 is, for example, a display or a projector. The display 140 executes, in accordance with an instruction from the controller 110, output processes corresponding to various known functions included in the display 140, such as "displaying an image on a screen" and "projecting an image onto a screen."

As the operating unit 130 and the display 140, for example, a touch panel may be used, or various other known input devices may be used.

[Functions Implemented by Image Processing Apparatus]

Next, functions implemented by the image processing apparatus 100 according to the embodiment will be described. As illustrated in FIG. 1, the image processing apparatus 100 includes the following functions: an image accepting unit 111, a significant pixel region acquiring unit 112, a marker/object discriminating unit 113, an indicated-position information acquiring unit 114, a reference position information acquiring unit 115, a region partitioning unit 116, a partition region identifying unit 117, and an object determining unit 118. These functions are implemented by, for example, execution of the program stored in the memory 120 by the controller 110. Hereinafter, the above functions will be described in detail with reference to FIGS. 2 to 10.

[Image Accepting Unit]

First, the image accepting unit 111 accepts a target image to be processed by the image processing apparatus 100 according to the present invention. For example, the image accepting unit 111 acquires a target image stored in the memory 120, by accepting a request from a user or a given application. Alternatively, the image accepting unit 111 may accept a target image from a given apparatus (such as a cellular phone, a digital camera, or a scanner) connected to the image processing apparatus 100, or may accept a target image by downloading the target image from an apparatus that is connected to the image processing apparatus 100 via a network.

Figure 2:
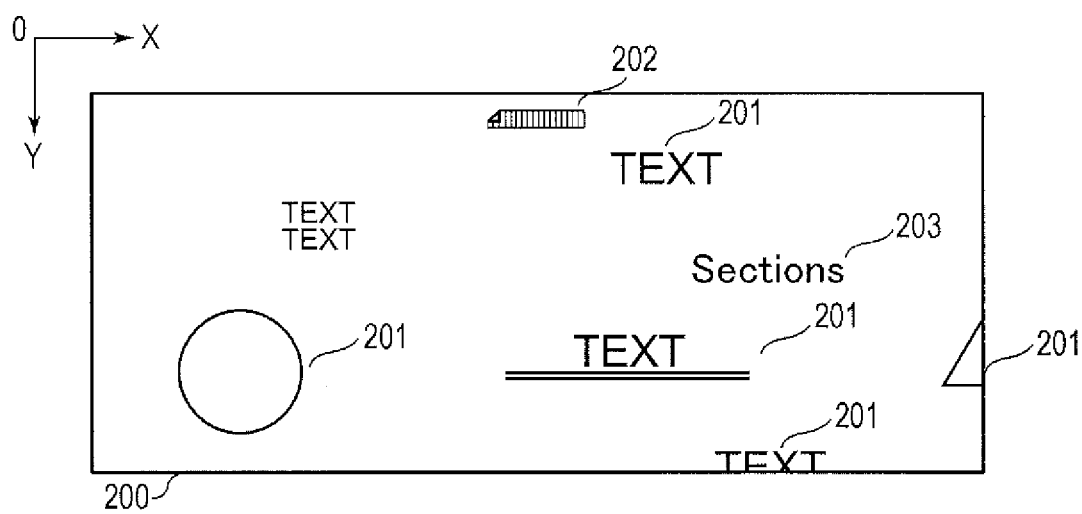
FIG. 2 illustrates an example of an image to be processed.

FIG. 2 illustrates an example of an image to be processed. An image 200 according to the embodiment is, for example, image data obtained by capturing an image of a white board (recording medium). As illustrated in FIG. 2, the image 200 shows objects 201 shown in a color (in this example, a color outside the color gamut of the surface of the white board) different from the background color, such as characters, pictures, geometric figures, or symbols drawn on the surface of the white board, and a marker 202 such as a sticky note that is disposed near the objects 201 for the purpose of indicating the objects 201.

The marker 202 shown in the image 200 may be any marker that has a predetermined image feature (for example, an image feature that may be detected by pattern matching). Other than the above sticky note, for example, a magnet, or a specific symbol or geometric figure may be also used.

The image 200 is not limited to an image obtained by capturing an image of the white board as mentioned above. The image 200 may be any image in which the object 201 and the marker 202 are shown on the background color, and may be, for example, an image created from a given application.

The image 200 is not limited to image data stored in the memory 120. Image data generated by an image generator 150 included in the image processing apparatus 100 may serve as image data to be processed. For example, as the image 200, the image accepting unit 111 may accept image data generated by the image generator 150. Further, after the region displayed on the display 140 is set as the region to be processed by the image processing apparatus 100 (to be referred to as target region hereinafter), the entire region of an image displayed as mentioned above may be acquired as the image 200.

Alternatively, for example, the image accepting unit 111 may acquire, as the image 200, an image shown in a region on the screen which is indicated by the user with a pointing device (such as a mouse or a touch panel).

[Significant Pixel Region Acquiring Unit]

The significant pixel region acquiring unit 112 acquires a significant pixel region shown in the image 200. For example, on the basis of the image acquired by the image accepting unit 111, the significant pixel region acquiring unit 112 acquires a plurality of significant pixel regions in accordance with a predetermined criterion. In this regard, a significant pixel region refers to a region in the image 200 which includes a color different from the background color. That is, each significant pixel region includes either the object 201 or the marker 202.

Figure 3:
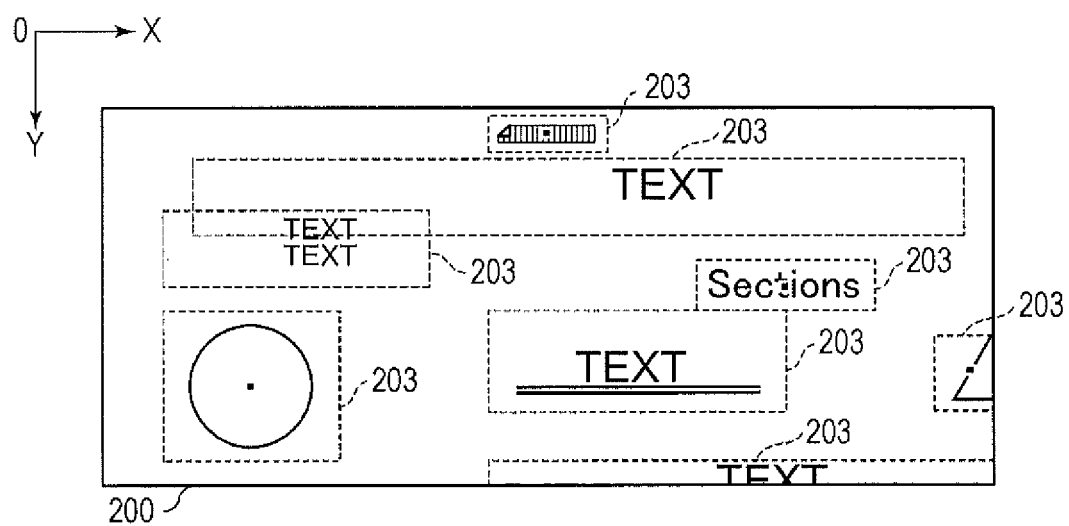
FIG. 3 illustrates an example of significant pixel regions.

FIG. 3 illustrates an example of significant pixel regions. As illustrated in FIG. 3, the significant pixel region acquiring unit 112 acquires significant pixel regions 203 from the objects 201 and the marker 202 shown in the image 200.

Specifically, first, the significant pixel region acquiring unit 112 acquires groups of consecutive pixels each made up of consecutive pixels with a color different from the background color. As an example of a method for acquiring such groups of consecutive pixels, a method widely known as a labelling process may be used. Then, the significant pixel region acquiring unit 112 defines a basic rectangle circumscribing each of the acquired groups of consecutive pixels, and computes the area of the basic rectangle, the density of background color pixels within the basic rectangle, the distance between basic rectangles, and the like to define the significant pixel region 203 combining a plurality of basic rectangles.

Next, the significant pixel region acquiring unit 112 acquires significant pixel region information from each of the significant pixel regions 203 defined in this way, and stores the significant pixel region information into the memory 120. The significant pixel region information includes, for example, the boundary position (the position of each vertex) of the significant pixel region 203, and the representative position (the position of the centroid) of the significant pixel region 203. In this case, the significant pixel region acquiring unit 112 first sets an X-coordinate axis and a Y-coordinate axis in a target region of the image 200. Then, the significant pixel region acquiring unit 112 acquires the coordinates of various positions relating to the significant pixel region 203 as significant pixel region information, and stores the significant pixel region information into the memory 120.

Alternatively, for example, the significant pixel region acquiring unit 112 may also acquire, as information indicative of the boundary of the significant pixel region 203, the position coordinates of the top left vertex, the distance in the X-coordinate axis direction and the distance in the Y-coordinate axis direction from the top left vertex.

Although the representative position of the significant pixel region 203 is not limited to the centroid position of the region, desirably, this information indicates the central position of this region.

While each of the significant pixel regions 203 is represented by a rectangle in FIG. 3, the significant pixel region 203 may be represented by another polygon or a circle. Further, the boundary position of the significant pixel region 203 in this case is not limited to the position coordinates of each vertex but may include, for example, a plurality of position coordinates indicative of positions lying on the boundary line of the region.

Further, on the basis of a feature (such as gray level or the number of colors) of the image portion included in each significant pixel region, the significant pixel region acquiring unit 112 may further divide one significant pixel region 203 into a plurality of regions, or may combine a plurality of the significant pixel regions 203 into one. Further, two significant pixel regions 203 may be located at overlapping positions.

[Marker/Object Discriminating Unit]

Next, the marker/object discriminating unit 113 discriminates the significant pixel region 203 as either the object 201 or the marker 202. For example, the marker/object discriminating unit 113 discriminates significant pixel region information as either the region of the object 201 or the region of the marker 202, in accordance with a predetermined criterion.

Figure 4:
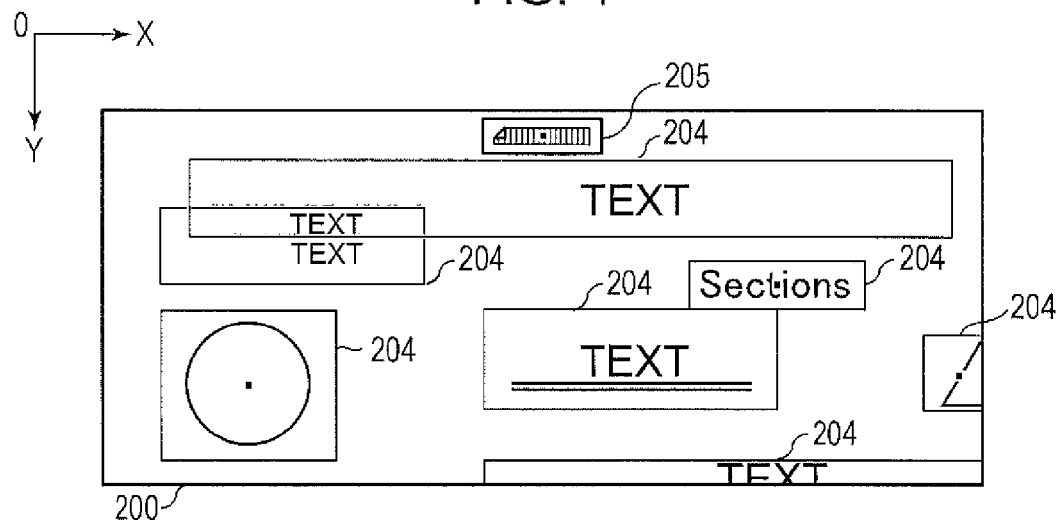
FIG. 4 illustrates an example of object's regions and a marker's region.

FIG. 4 illustrates an example of the regions of the objects 201, and the region of the marker 202. A marker's region 205 is a region in the image 200 which includes the marker 202. An object's region 204 is a region in the image 200 which includes the object 201.

An example of a method used by the marker/object discriminating unit 113 to discriminate each significant pixel region 203 is pattern matching. For example, for an image shown in the significant pixel region 203, the marker/object discriminating unit 113 performs pattern matching against a reference image previously acquired and stored in the memory 120. If the image in the significant pixel region 203 is similar to the reference image, the significant pixel region 203 is discriminated as the marker's region 205, and if the image is not similar to the reference image, the significant pixel region 203 is discriminated as the object's region 204.

The method used by the marker/object discriminating unit 113 to discriminate each significant pixel region 203 is not limited to pattern matching but may be, for example, comparison with an image feature set by the user. For example, the marker/object discriminating unit 113 may discriminate the image in each significant pixel region 203 on the basis of information such as the shape or color of the marker accepted by a user's operation.

[Indicated-Position Information Acquiring Unit]

The indicated-position information acquiring unit 114 acquires indicated-position information including at least one user-indicated position. For example, the indicated-position information acquiring unit 114 acquires indicated-position information on the basis of the marker 202 in the image 200. Specifically, the indicated-position information acquiring unit 114 acquires the representative position of the marker's region 205 as indicated-position information, and stores the indicated-position information into the memory 120.

Indicated-position information may include information indicative of a user-indicated line segment or a user-indicated region. In this case, information indicative of a user-indicated line segment refers to, for example, information indicative of a line segment passing through the representative position of the marker's region 205 and delimited on the basis of the boundary position of the marker's region 205. Further, information indicative of a user-indicated region is, for example, information indicative of the region bounded by the boundary position of the marker's region 205, and includes the boundary position itself.

In the embodiment, indicated-position information includes the position coordinates of each vertex as the boundary position of the marker's region 205. That is, the indicated-position information includes a user-indicated region.

The indicated-position information acquiring unit 114 may acquire indicated-position information on the basis of a user's operation performed with the operating unit 130, in addition to significant pixel region information indicative of the marker's region 205. For example, the indicated-position information acquiring unit 114 may acquire indicated-position information on the basis of a position, a line segment, or a region on the screen which is indicated by the user with a pointing device (such as a mouse or a touch panel). For example, the indicated-position information acquiring unit 114 may acquire coordinate values included in the indicated-position information from values input by the user with a keyboard or the like.

Alternatively, for example, if a projector is used as the display 140, the indicated-position information acquiring unit 114 may acquire indicated-position information by detecting, by using a known technique, a position indicated with a human finger or the like with respect to an image projected by the projector.

Figure 5:
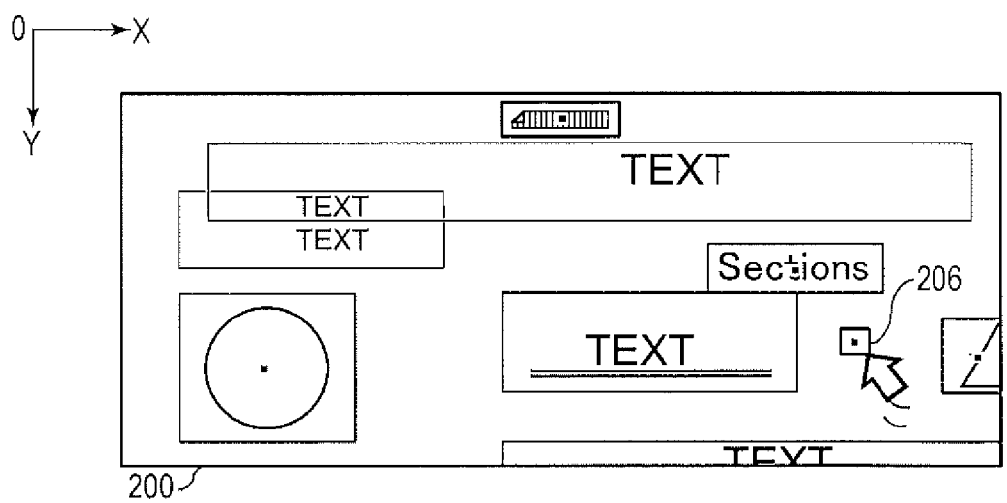
FIG. 5 illustrates an example of a region indicated with a pointing device.

FIG. 5 illustrates an example of a region 206 indicated with a pointing device. In the embodiment, indicated-position information further includes a user-indicated region accepted in this way.

The image processing apparatus 100 may cause an image showing the indicated-position information acquired in this way to be displayed on the display 140 while being superimposed on the image 200, thus making the image visible to the user.

[Reference Position Information Acquiring Unit]

The reference position information acquiring unit 115 acquires reference position information including the position of the object 201 in the image 200. For example, the reference position information acquiring unit 115 acquires the representative position of the object's region 204 (that is, the position of the object 201 in the image 200) as reference position information, and stores the reference position information in the memory 120.

Reference position information may include at least one position indicative of the boundary of the target region of the image 200. For example, the reference position information acquiring unit 115 may acquire, as a position indicative of the boundary of the target region of the image 200, the vertex coordinates of this region, and cause the vertex coordinates to be included in the reference position information. In the embodiment, the reference position information includes the representative position of the object's region 204, and the position of each vertex of the target region in the image 200.

Further, other than reference position information, the reference position information acquiring unit 115 also acquires the position of the object 201, and the region of the object 201. For example, the reference position information acquiring unit 115 acquires the representative position and boundary position of the object's region 204 as object position information. In the embodiment, object position information includes the representative position and boundary position of the object's region 204.

[Region Partitioning Unit]

The region partitioning unit 116 partitions the target region of the image 200 on the basis of reference position information to generate a plurality of partition regions.

Specifically, first, the region partitioning unit 116 acquires reference position information stored in the memory 120, and sets a plurality of positions included in the reference position information as the positions of sites. Next, on the basis of the positions of the sites, the region partitioning unit 116 defines Voronoi boundaries and Delaunay boundaries in the target region of the image 200. Then, the region partitioning unit 116 acquires partition region information from a plurality of partition regions formed by the defined boundary lines, and stores the partition region information into the memory 120.

Voronoi boundaries refer to, for example, boundary lines in a Voronoi diagram, which represents a division of space into regions according to which site a given position shown in the image 200 is close to. Characteristically, such Voronoi boundaries become part of the bisectors between individual sites, and form polygons.

Further, Delaunay boundaries refer to, for example, boundary lines formed by connecting sites included in partition regions that are neighbors to each other, among a plurality of partition regions defined by the previously generated Voronoi boundaries. Characteristically, the Delaunay boundaries defined in this way form triangles, except for special cases.

Figure 6:
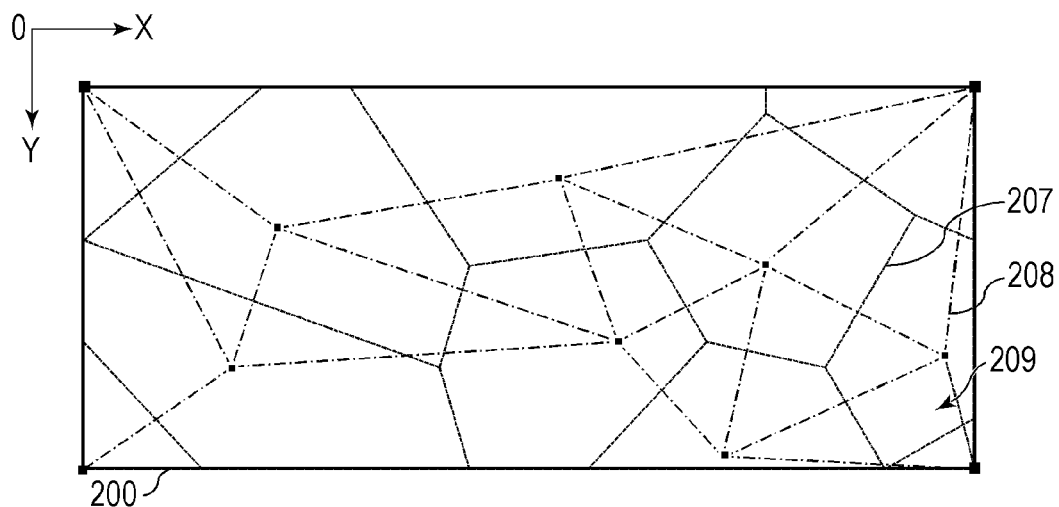
FIG. 6 illustrates an example of Voronoi boundaries, Delaunay boundaries, and partition regions defined by their respective boundary lines.

FIG. 6 illustrates an example of Voronoi boundaries, Delaunay boundaries, and partition regions 209 formed by these boundary lines. As illustrated in FIG. 6, the region partitioning unit 116 acquires a plurality of pieces of partition region information, with each of regions delimited by Voronoi boundaries 207 (indicated by broken lines in FIG. 6) and Delaunay boundaries 208 (indicated by alternate long and short dash lines in FIG. 6) being the partition region 209. In the embodiment, the partition region 209 mentioned above different from the object's region 204 is generated, and the corresponding partition region information is acquired.

The image processing apparatus 100 may cause an image showing each partition region acquired in this way to be displayed on the display 140 while being superimposed on the image 200, thus making the image visible to the user. Further, after making the image visible to the user in this way, the image processing apparatus 100 may wait for a user's operation from the indicated-position information acquiring unit 114 to acquire indicated-position information.

[Partitioned Region Identifying Unit]

The partition region identifying unit 117 identifies at least one partition region on the basis of a plurality of the partition regions 209 and indicated-position information. For example, the partition region identifying unit 117 determines whether partition region information is identified on the basis of indicated-position information.

Figure 7:
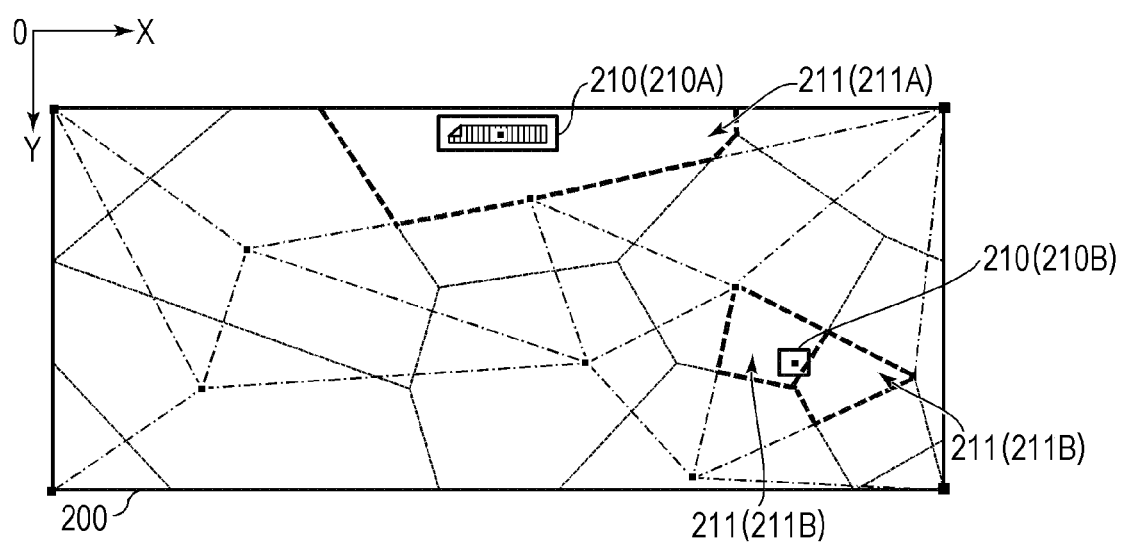
FIG. 7 illustrates an example of identified partition regions.

FIG. 7 illustrates an example of partition regions 211 that have been identified. As illustrated in FIG. 7, the partition region identifying unit 117 identifies each of the partition regions 211 on the basis of a region that is based on indicated-position information (to be referred to as an indicated region 210 hereinafter). In this case, a partition region 211A including an indicated region 210A is identified. Further, a plurality of partition regions 211B overlapping a part of an indicated region 210B are identified.

For example, the partition region identifying unit 117 acquires a plurality of pieces of partition region information and indicated-position information which are stored in the memory 120. Then, for each of the partition regions 209 obtained from all of the pieces of partition region information, it is determined whether the partition region 209 at least partially overlaps the indicated region 210 obtained from the indicated-position information. If the two regions at least partially overlap, the partition region identifying unit 117 identifies the partition region 209, assigns "1" to the identification result of the corresponding partition region information, and stores this identification result into the memory 120. If the two regions do not overlap, the partition region identifying unit 117 does not identify the partition region 209, assigns "0" to the identification result of the corresponding partition region information, and stores this identification result into the memory 120.

If, like the indicated region 210B illustrated in FIG. 7, one indicated region 210 overlaps a plurality of the partition regions 209, alternatively, for example, the one partition region that contains the largest area of the indicated region 210B may be identified.

Further, alternatively, for example, the partition region 209 that at least partially overlaps an indicated line segment obtained from indicated-position information may be identified. Further, alternatively, for example, the partition region 209 that at least partially overlaps an indicated position obtained from indicated-position information may be identified.

[Object Determining Unit]

The object determining unit 118 determines whether the object 201 has been selected, on the basis of the partition region 211 that has been identified. For example, for at least one object's region 204 (object 201), the object determining unit 118 determines whether the object's region 204 has been selected, on the basis of object position information and partition region information.

Figure 8:
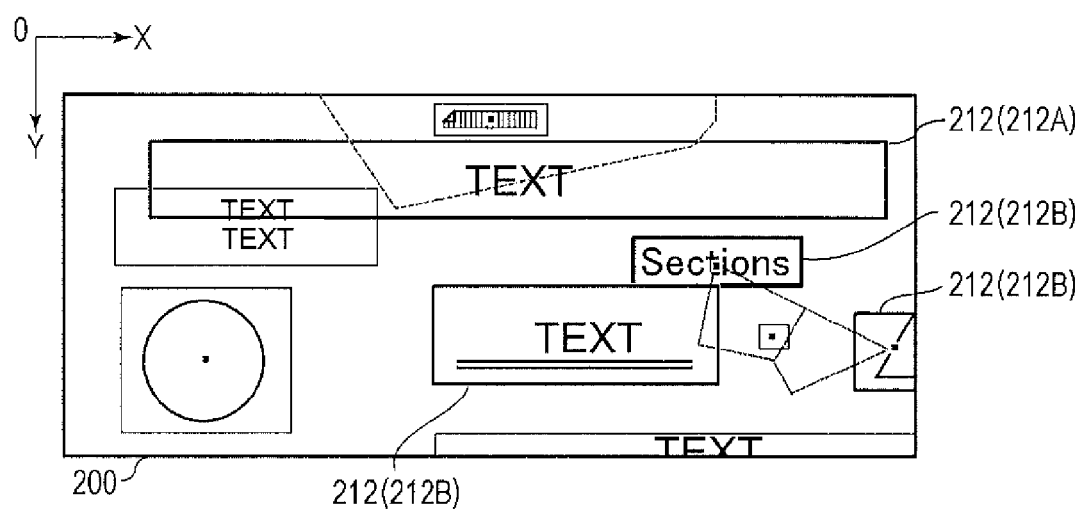
FIG. 8 illustrates an example of object's regions that have been selected.

FIG. 8 illustrates an example of object's regions 212 that have been selected. As illustrated in FIG. 8, the object determining unit 118 determines that an object's region 212A overlapping the partition region 211A that has been identified, and the corresponding object 201 have been selected. Likewise, the object determining unit 118 determines that object's regions 212B overlapping the partition regions 211B that have been identified, and the corresponding objects 201 have been selected.

If the partition region 211 that has been identified is the partition region 211 that is partitioned on the basis of a position indicative of the boundary of the target region of the image 200, and is determined to be not related to the object 201, the object determining unit 118 determines that the object has not been selected. For example, although not illustrated in FIG. 8, if the partition region 211 identified on the basis of indicated-position information does not overlap the object's region 204, neither the object's region 204 nor the object 201 is determined to have been selected.

Specifically, first, the object determining unit 118 acquires object position information, indicated-position information, and partition region information including identification results, which are stored in the memory 120. Then, for the object's region 204 based on the object position information, the object determining unit 118 determines whether the object's region 204 at least partially overlaps the indicated region 210 obtained from the indicated-position information, and the partition region 211 based on the partition region information for which "1" is assigned to the identification result. If these regions at least partially overlap, the object determining unit 118 determines that the object's region 204 (the corresponding object 201) has been selected. That is, the object determining unit 118 sets "1" for the corresponding object selection result, and stores this object selection result into the memory 120. If these regions do not overlap, the object determining unit 118 determines that the object's region 204 (the corresponding object 201) has not been selected. That is, the object determining unit 118 sets "0" for the corresponding object selection result, and stores this object selection result into the memory 120.

[Processing Executed by Image Processing Apparatus]

Figure 9:
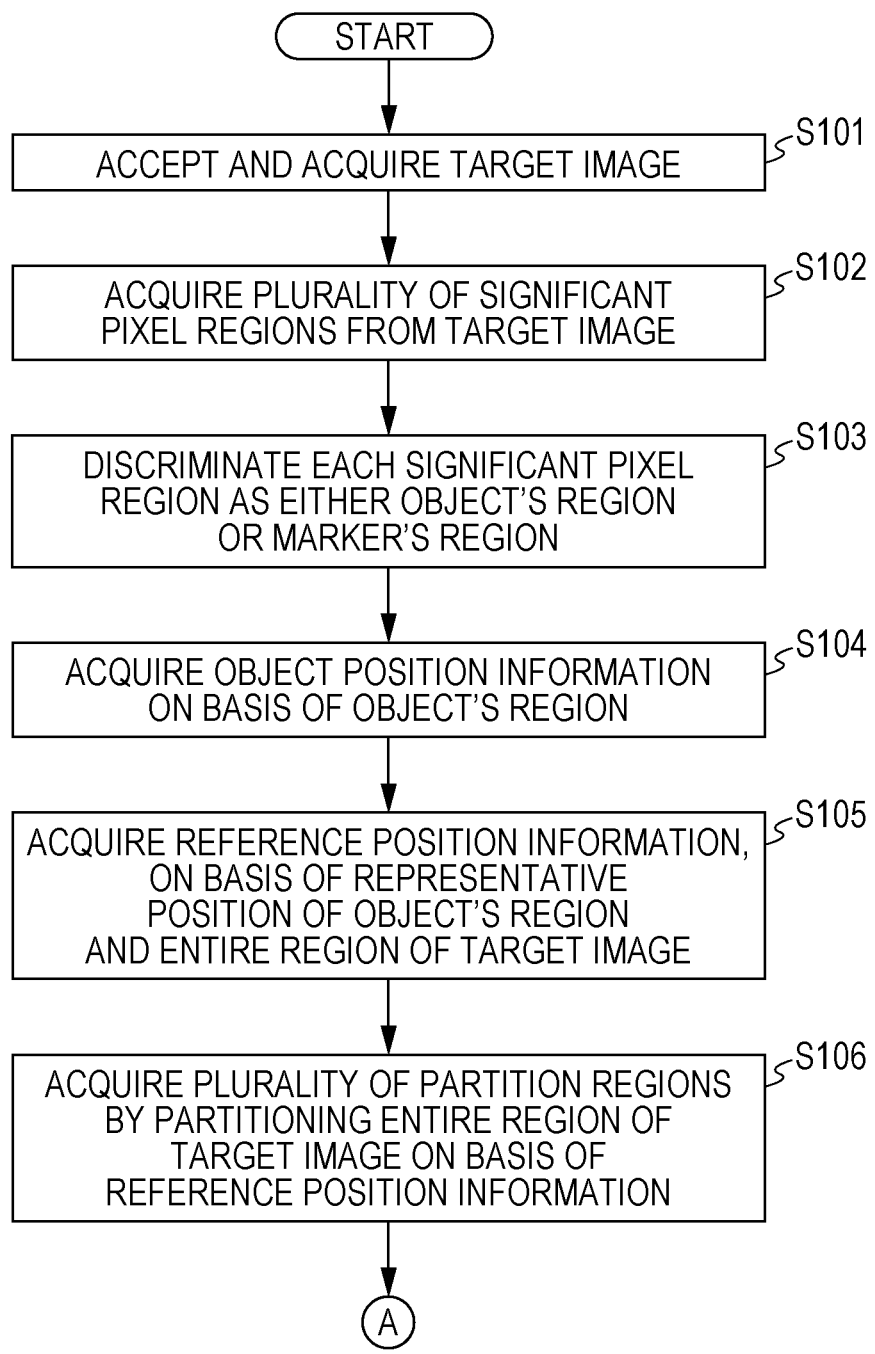
FIG. 9 is a flowchart illustrating processing executed by the image processing apparatus.
Figure 10:
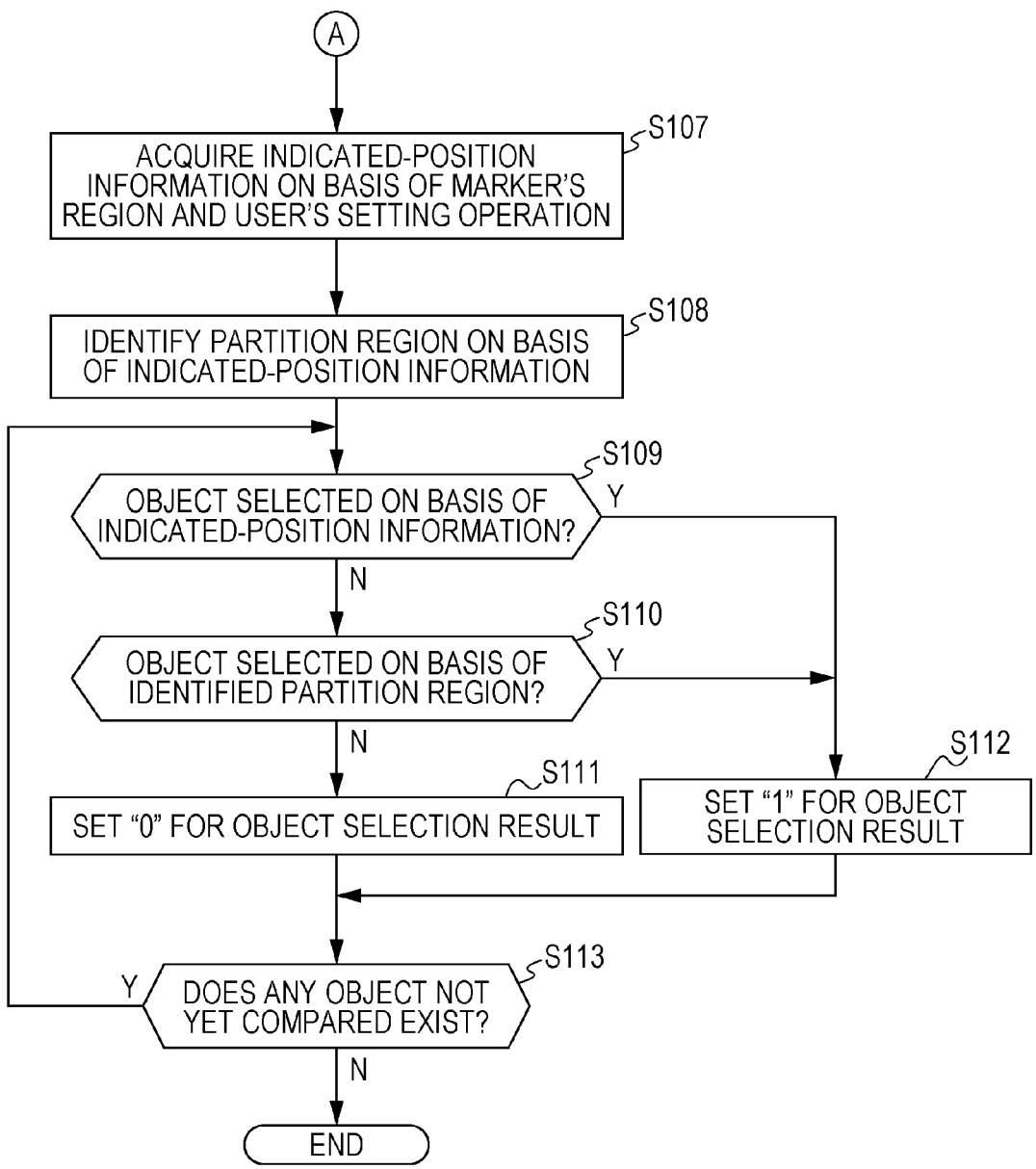
FIG. 10 is a flowchart illustrating processing executed by the image processing apparatus.

Next, processing executed by the image processing apparatus 100 according to the embodiment will be described. FIGS. 9 and 10 are flowcharts illustrating the processing executed by the image processing apparatus 100 according to the embodiment. Hereinafter, the processing executed by the image processing apparatus 100 will be described with reference to the flowcharts.

First, as illustrated in FIG. 9, the image accepting unit 111 acquires the image 200 by accepting a user's operation or a request from a given application or the like (S101). Next, on the basis of the image 200 acquired in S101, the significant pixel region acquiring unit 112 acquires a plurality of the significant pixel regions 203 in accordance with a predetermined criterion (S102). Subsequently, the marker/object discriminating unit 113 discriminates each of the plurality of significant pixel regions 203 acquired in S102 as either the object's region 204 or the marker's region 205 (S103), in accordance with a predetermined criterion.

Subsequently, in the flowchart illustrated in FIG. 9, the reference position information acquiring unit 115 acquires object position information from the object's region 204 discriminated in S103 (S104). Further, the reference position information acquiring unit 115 acquires reference position information, on the basis of the representative position of the object's region 204 and positions on the boundary of the target region of the image 200 (S105). Subsequently, the region partitioning unit 116 acquires the positions of a plurality of sites from the reference position information, and partitions the target region of the image 200 on the basis of the sites to generate a plurality of the partition regions 209 (S106).

Subsequently, in the flowchart illustrated in FIG. 10, the indicated-position information acquiring unit 114 acquires indicated-position information, on the basis of the marker's region 205 discriminated in S103, and a user's setting operation (S107). Subsequently, from the plurality of partition regions 209 generated in S106, the partition region identifying unit 117 identifies, on the basis of the indicated-position information acquired in S107, the partition region 211 indicated by the indicated-position information (S108).

Subsequently, on the basis of the indicated-position information acquired in S107, the object determining unit 118 determines whether the object 201 has been selected (S109). If it is determined that the object 201 has been selected (S109: Y), "1" is set for the object selection result, and this object selection result is stored into the memory 120 (S112).

Further, if it is determined in the object determining unit 118 that the object 201 has not been selected (S109: N), it is further determined on the basis of the partition region 211 identified in S108 whether the object 201 has been selected (S110). If it is determined that the object has been selected (S110: Y), "1" is set for the object selection result (S112), and if it is determined that the object has not been selected (S110: N), "0" is set for the object selection result (S111), and this object selection result is stored into the memory 120. Until this determination is finally made for all of the objects 201 (S113: Y), the determination process (S109 to S112) for the object 201 is repeated (S113: N).

Through the above processing, the image processing apparatus 100 generates the partition regions 209 that partition the target region of the image 200, and identifies at least one partition region 211 on the basis of a user-indicated position. Consequently, the object 201 for which the object's region 204 does not overlap the user-indicated position may be also determined to have been selected.

[Modifications]

The present invention is not limited to the foregoing embodiment. The present invention may be modified as appropriate without departing from the scope of the invention.

(1) For example, the above embodiment is directed to the case where the object determining unit 118 determines whether the object 201 has been selected, on the basis of the object's region 204. However, the object determining unit 118 may execute this determination process on the basis of the position of the object 201.

Figure 11:
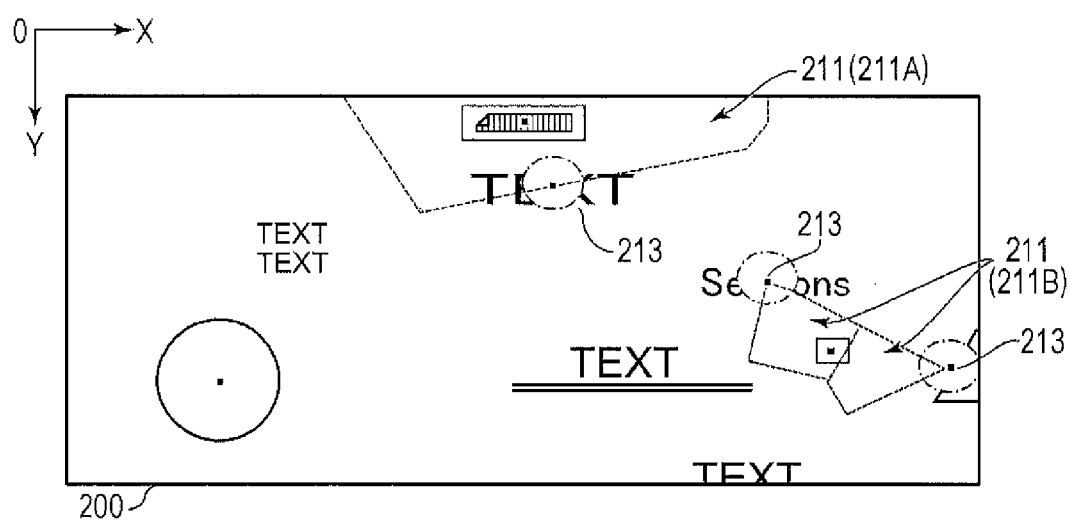
FIG. 11 illustrates an example of selected object's positions according to a modification.

FIG. 11 illustrates an example of object's positions 213 that have been selected. As illustrated in FIG. 11, the object determining unit 118 according to this modification determines that each of the object's positions 213 in contact with the partition region 211 that has been identified, and the object 201 based on this position have been selected.

In a case where whether the object 201 is to be selected is determined on the basis of the position of the object 201 in this way, the region partitioning unit 116 may include, in partition region information, the reference position information used as the basis for partitioning the partition regions 209. In this case, the object determining unit 118 acquires the object's position 213 on the basis of the reference position information further assigned to identified partition region information, and determines that the object's position and the object 201 have been selected.

According to Modification (1), the object 201 that does not overlap in position with a user-indicated position may be also determined to have been selected.

(2) For example, the above embodiment is directed to the case where at least one object 201 and at least one marker 202 are shown in the image 200 to be processed. However, it suffices that at least one object 201 be shown in the image 200. That is, the marker 202 may not be shown in the image 200.

In this case, the image processing apparatus 100 may not include the marker/object discriminating unit 113 described with reference to the above embodiment. In this case, in the image processing apparatus 100, all of significant pixel regions acquired by the significant pixel region acquiring unit 112 are set as the object's regions 204. Then, the indicated-position information acquiring unit 114 acquires indicated-position information on the basis of a user's operation performed with the operating unit 130.

According to Modification (2), even in the case of the image 200 in which at least one object 201 is shown, the object 201 that does not overlap in position with a user-indicated position may be determined to have been selected.

(3) Further, for example, when the region partitioning unit 116 of the image processing apparatus 100 partitions the target region of the image 200, the region partitioning unit 116 may acquire the positions of sites on the basis of reference position information, and generate a plurality of the partition regions 209 from the boundary lines of the Voronoi boundaries based on the positions of these sites, thereby acquiring partition region information. That is, the region partitioning unit 116 may generate the plurality of partition regions 209 without defining the Delaunay boundaries described with reference to the above embodiment.

Figure 12:
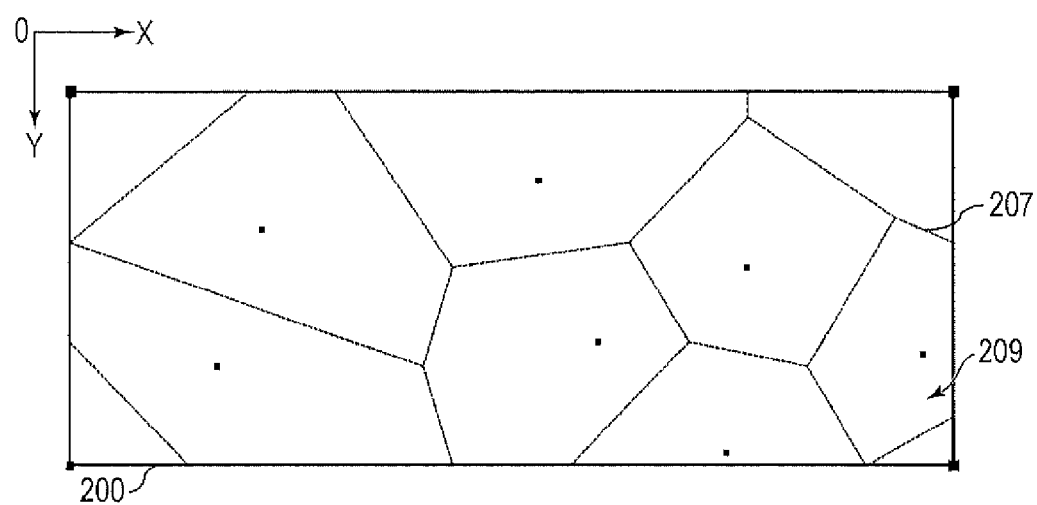
FIG. 12 illustrates an example of Voronoi boundaries, and partition regions generated from their boundary lines.

FIG. 12 illustrates an example of the Voronoi boundaries 207 (indicated by broken lines in FIG. 12) and the partition regions 209 generated from the boundary lines. Each of the partition regions 209 illustrated in FIG. 12 has a large area in comparison to the partition regions 209 illustrated in FIG. 6 described with reference to the above embodiment (the partition regions 209 generated from the boundary lines of the Voronoi boundaries 207 and Delaunay boundaries 208).

Figure 13:
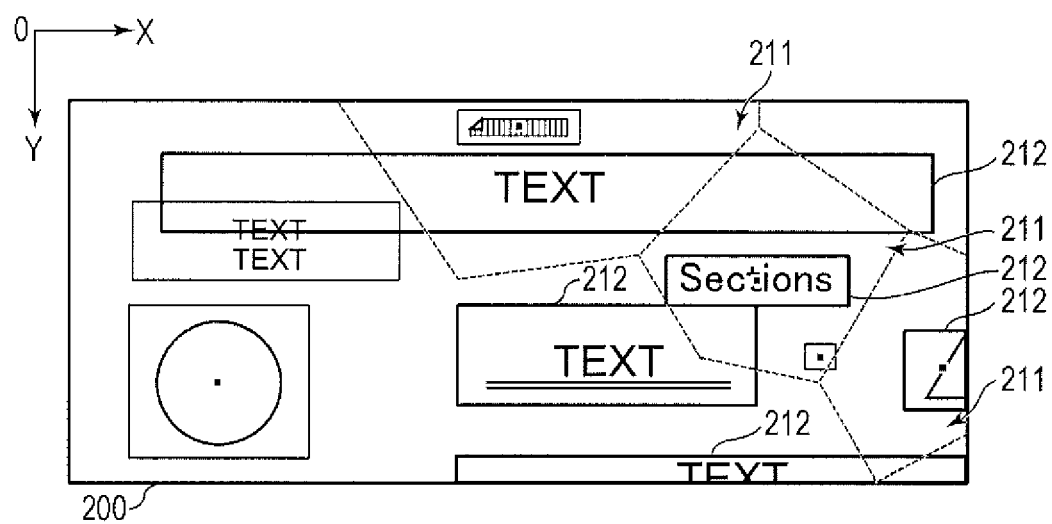
FIG. 13 illustrates an example of identified partition regions, and selected object's regions according to a modification.

Further, FIG. 13 illustrates an example of the partition regions 211 each identified on the basis of a user-indicated position, and the object's regions 212 that have been selected in accordance with this modification. The identified partition regions 211 illustrated in FIG. 13 also have a large area in comparison to those illustrated in FIGS. 7 and 8 with reference to the above embodiment. Further, with regard to the object's regions 212 illustrated in each of FIGS. 7 and 8, a greater number of the object's regions 212 are determined to have been selected in accordance with this modification.

That is, in comparison to the above embodiment, it is possible for the object determining unit 118 according to this modification to determine a greater number of the object's regions 212 (objects 201) to have been selected.

According to Modification (3), a greater number of the objects 201 may be determined to have been selected than in the above embodiment. In other words, according to the above embodiment, a number of the objects 201 that do not overlap in position with a user-indicated position may be also determined to have been selected.

(4) Further, for example, the image processing apparatus 100 may associate indicated-position information with indicated-processing information indicative of user-indicated processing with respect to the object 201, and execute the processing according to the indicated-processing information (image processing with respect to the object's region 204) for the object 201 that is determined to have been selected.

Figure 14:
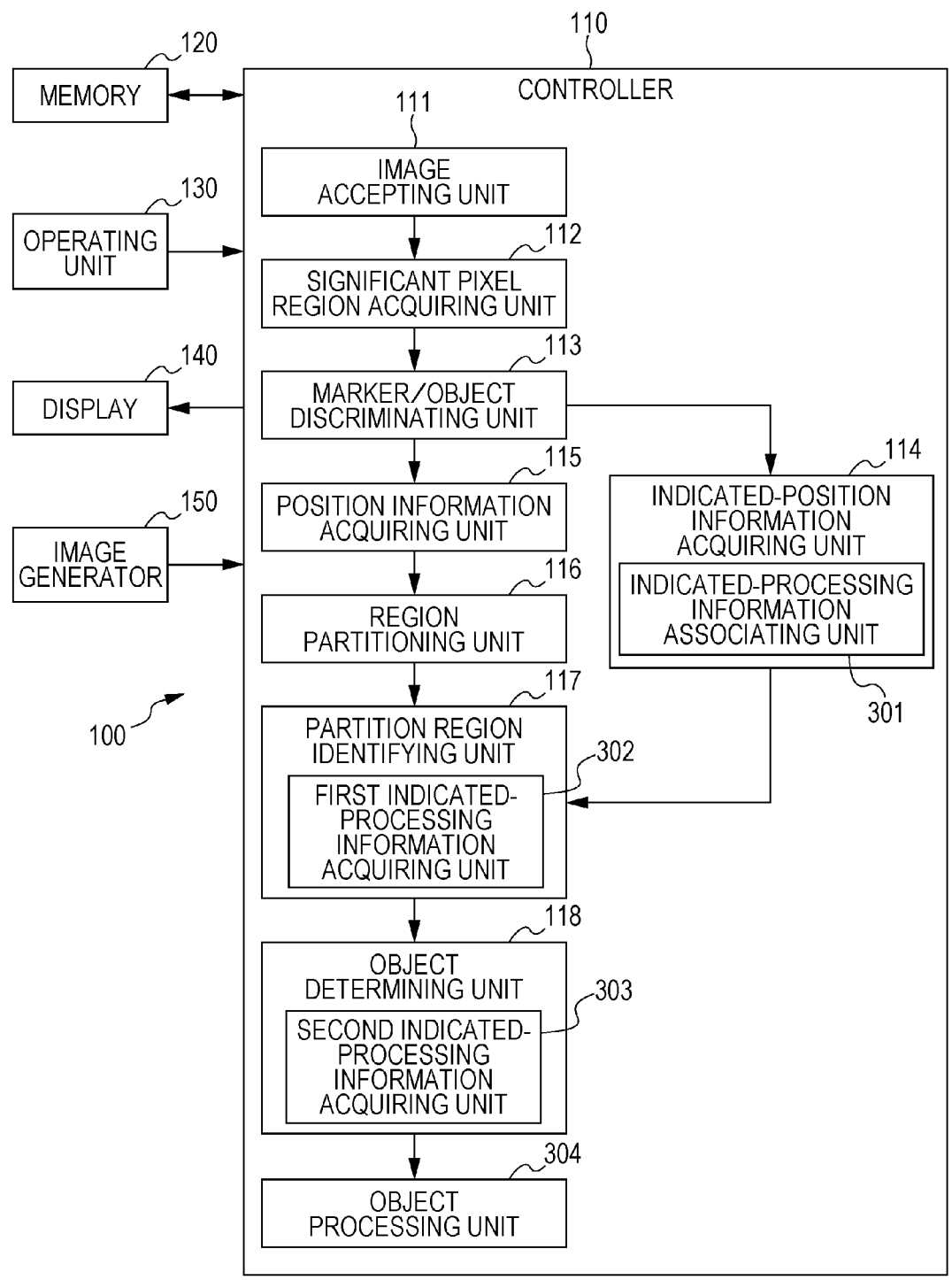
FIG. 14 illustrates an example of an image processing apparatus according to a modification.

FIG. 14 illustrates an example of an image processing apparatus according to this modification. As illustrated in FIG. 14, in comparison to the image processing apparatus 100 according to the above embodiment, the image processing apparatus 100 according to this modification further includes the following functions: an indicated-processing information associating unit 301, a first indicated-processing information acquiring unit 302, a second indicated-processing information acquiring unit 303, and an object processing unit 304. Like the functions according to the above embodiment, these functions are also implemented by, for example, execution of the program stored in the memory 120 by the controller 110. Hereinafter, these added functions will be described in detail.

(Indicated-Processing Information Associating Unit)

The indicated-processing information associating unit 301 associates indicated-position information with indicated-processing information indicative of user-indicated processing with respect to an object. In this regard, the indicated-processing information is, for example, information including details of image processing (such as a masking process, an encryption process, and a distribution process) that is executed for the object's region 204 in the image 200. The indicated-processing information may also include, for example, information indicative of the order of priority of predetermined processing (such as the sequence of rendering processes applied when the image 200 is displayed).

Specifically, for example, the indicated-processing information associating unit 301 accepts a user's operation performed with the operating unit 130, and associates each indicated-position information with indicated-processing information. In this case, the image processing apparatus 100 may display, on the display 140, an image showing the indicated-position information, and a listing of the details of indicated-processing information. After making various information visible to the user in this way, the indicated-processing information associating unit 301 accepts a user's operation that selects indicated-position information and indicated-processing information, and associates the selected indicated-position information and the selected indicated-processing information with each other.

Alternatively, for example, in a case where the marker 202 is shown in the image 200, and a region including the marker 202 is discriminated as the marker's region 205, the indicated-processing information associating unit 301 acquires, on the basis of a reference image or image feature used as the basis for discriminating the marker's region 205, indicated-processing information that is associated with the reference image or image feature in advance, and associates the acquired indicated-processing information with the indicated-processing information.

In addition to associating indicated-position information with indicated-processing information, the indicated-processing information associating unit 301 may, for example, further associate the indicated-position information with information indicative of the order of priority of processing in each indicated processing (to be referred to as processing priority order information hereinafter).

(First Indicated-Processing Information Acquiring Unit)

The first indicated-processing information acquiring unit 302 acquires indicated-processing information that is associated with indicated-position information used in the identifying of the partition region 211 that has been identified, and is related to the identified partition region 211. For example, the first indicated-processing information acquiring unit 302 may acquire, as indicated-processing information related to the partition region 211, indicated-processing information associated with the indicated-position information used as the basis for the identifying of the partition region 211 by the partition region identifying unit 117.

In this modification, a case may occur in which the identified partition region 211 is identified on the basis of a plurality of pieces of indicated-position information. In this case, the first indicated-processing information acquiring unit 302 may, for example, acquire indicated-processing information for all of the pieces of indicated-position information used as the basis for the determination. Alternatively, for example, if processing priority order information is associated, the indicated-processing information with the highest priority may be acquired. Alternatively, for example, the indicated-processing information to be associated may be determined on the basis of, among the indicated regions 210 indicated by the pieces of indicated-position information, the indicated-position information with the largest area contained by the identified partition region 211.

(Second Indicated-Processing Information Acquiring Unit)

The second indicated-processing information acquiring unit 303 acquires the indicated-processing information that is associated with the identified partition region used in the determination of the object 201 determined to have been selected, and is related to the object. For example, the second indicated-processing information acquiring unit 303 may acquire indicated-processing information related to the partition region 211 that is used by the object determining unit 118 as the basis for determining that the object's region 212 and the object 201 have been selected, as the indicated-processing information related to the object's region 212 and the object 201.

Further, the second indicated-processing information acquiring unit 303 may also acquire indicated-processing information associated with the indicated-position information used as the basis for the above determination, as indicated-processing information related to the object's region 212 and the object 201.

In this modification, a case may occur in which the object's region 212 is selected on the basis of a plurality of pieces of indicated-processing information, or a plurality of the partition regions 211 that have been identified. In this case, the second indicated-processing information acquiring unit 303 may acquire all of the pieces of indicated-processing information used as the basis for the above selection. Alternatively, for example, if processing priority order information is associated, the indicated-processing information with the highest priority may be acquired.

Alternatively, for example, the indicated-processing information associated with the region that contains the largest area of the object's region 212 may be acquired.

(Object Processing Unit)

The object processing unit 304 executes, for the object 201 determined to have been selected, processing indicated by the indicated-processing information related to the object 201. For example, on the basis of indicated-processing information related to the object 201 which is acquired by the second indicated-processing information acquiring unit, the object processing unit 304 executes processing indicated by the indicated-processing information (image processing with respect to the object's region 204).

(Processing Executed in Modification (4))

Figure 15:
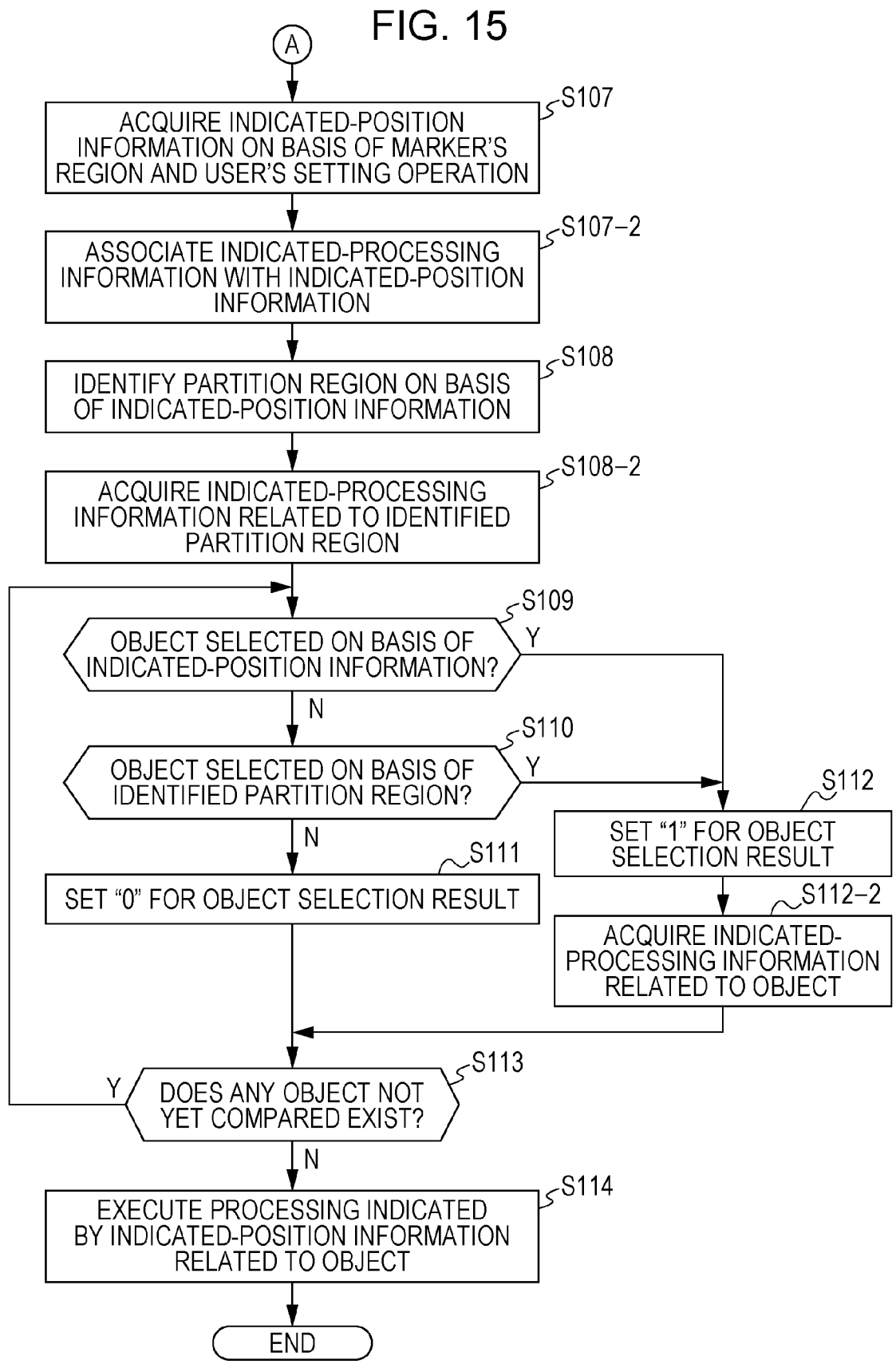
FIG. 15 is a flowchart illustrating processing executed by an image processing apparatus according to a modification.

Next, processing executed by the image processing apparatus 100 according to this modification will be described. FIGS. 9 and 15 are flowcharts illustrating the processing executed by the image processing apparatus 100 according to this modification. Hereinafter, the processing executed by the image processing apparatus 100 will be described with reference to the flowcharts. Any repetitive description of processing identical to the processing executed in the above embodiment is omitted herein.

In the flowchart illustrated in FIG. 15, the indicated-processing information associating unit 301 associates the indicated-position information acquired in S107 with indicated-processing information indicative of user-indicated processing with respect to the object 201 (S107-2). Then, the first indicated-processing information acquiring unit 302 acquires indicated-processing information related to the partition region 211 identified in S108 (S108-2). Further, the second indicated-processing information acquiring unit 303 acquires indicated-processing information related to the object 201 that is determined to have been selected in S109 or S110 (S112-2).

Subsequently, on the basis of the indicated-processing information related to the object 201 which is acquired in S112-2, the object processing unit 304 executes the processing indicated by the indicated-processing information (image processing with respect to the object's region 204) (S114).

With the above processing according to Modification (4), processing (image processing) associated with indicated-position information may be executed also for the object 201 that does not overlap in position with a user-indicated position.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a computer programmed to:
acquire significant pixel regions shown in an image in which at least one object and at least one marker are shown;
discriminate the significant pixel regions as one of the object's region and the marker's region in accordance with a predetermined criterion;
acquire indicated-position information on the basis of the marker in the image;
acquire reference position information including a position of the object in the image and a position of at least one of a plurality of vertices of a target region of the image, the target region being formed to be a multangular shape having the plurality of vertices;
partition the target region of the image on a basis of the reference position information to generate a plurality of partition regions;
identify at least one partition region on a basis of the plurality of partition regions and the indicated-position information; and
determine whether the object has been selected, on a basis of the identified partition region.

2. The image processing apparatus according to claim 1, wherein the computer is programmed to determine whether the object has been selected, on a basis of a position of the object or a region of the object.

3. The image processing apparatus according to claim 1, wherein:
the reference position information includes at least one position indicative of a boundary of the target region of the image, and
the computer is further programmed to determine whether the identified partition region is related to the object, and to determine the object to have not been selected when the identified partition region is a partition region that is partitioned on a basis of a position indicative of a boundary of the target region of the image, and is determined to be not related to the object.

4. The image processing apparatus according to claim 1, wherein the computer is further programmed to acquire positions of sites in the image on a basis of the reference position information, and to partition the target region of the image on a basis of Voronoi boundaries defined on a basis of the positions of the sites to generate the plurality of partition regions.

5. The image processing apparatus according to claim 4, wherein the computer is further programmed to partition the target region of the image on a basis of Delaunay boundaries defined on a basis of the positions of the sites and the Voronoi boundaries to generate the plurality of partition regions.

6. The image processing apparatus according to claim 1, wherein:

the indicated-position information includes information indicative of a user-indicated line segment or a user-indicated region, and the computer is programmed to identify the at least one partition region on a basis of the information indicative of the user-indicated line segment or the user-indicated region.

7. The image processing apparatus according to claim 1, wherein the computer is further programmed to:

associate the indicated-position information with indicated-processing information indicative of user-indicated processing with respect to the object;

acquire the indicated-processing information that is associated with the indicated-position information used in the identifying of the identified partition region, and that is related to the identified partition region;

acquire the indicated-processing information that is associated with the identified partition region used in the determining of the object determined to have been selected, and that is related to the object; and execute, for the object determined to have been selected, processing indicated by the indicated-processing information related to the object.

8. An image processing method comprising:

acquiring, by a computer, significant pixel regions shown in an image in which at least one object and at least one marker are shown;

discriminating the significant pixel regions, by the computer, as one of the object's region and the marker's region in accordance with a predetermined criterion;

acquiring indicated-position information, by the computer, on the basis of the marker in the image;

acquiring reference position information, by the computer, including a position of the object in the image and a position of at least one of a plurality of vertices of a target region of the image, the target region being formed to be a multangular shape having the plurality of vertices;

partitioning the target region of the image, by the computer, on a basis of the reference position information to generate a plurality of partition regions;

identifying at least one partition region, by the computer, on a basis of the plurality of partition regions and the indicated-position information; and determining, by the computer, whether the object has been selected, on a basis of the identified partition region.

9. A non-transitory computer readable medium storing a program causing a computer to perform the following functions:

acquiring significant pixel regions shown in an image in which at least one object and at least one marker are shown;

discriminating the significant pixel regions as one of the object's region and the marker's region in accordance with a predetermined criterion;

acquiring indicated-position information on the basis of the marker in the image;

acquiring reference position information including a position of the object in the image and a position of at least one of a plurality of vertices of a target region of the image, the target region being formed to be a multangular shape having the plurality of vertices;

partitioning the target region of the image on a basis of the reference position information to generate a plurality of partition regions;

identifying at least one partition region on a basis of the plurality of partition regions and the indicated-position information; and determining whether the object has been selected, on a basis of the identified partition region.

10. The image processing apparatus according to claim 1, wherein the computer comprises a memory that stores a reference image, and the computer is further programmed to perform pattern matching for the significant pixel regions against the reference image to discriminate the marker's region from the object's region.

* * * * *